Patented Feb. 9, 1937

2,070,158

UNITED STATES PATENT OFFICE 2,070,158

PROCESS FOR THE PREPARATION OF GRINDING OR POLISHING TOOLS

Ernst Elbel and Otto Sussenguth, Erkner, near Berlin, Germany, assignors, by mesne assignments, to Bakelite Corporation, New York, N. Y., a corporation of Delaware No Drawing. Application June 4, 1931, Serial No. 542,102. In Germany June 17, 1930

2 Claims. (Cl. 51—280)

In our application Ser. No. 517,632, filed Feb. 21, 1931 a process is described for the preparation of grinding or polishing tools from grained abrasive materials and phenol resins. The process consists in converting hardenable phenol-aldehyde resins in dissolved condition into B resins, and this solution is worked with the abrasive materials into grinding or polishing tools in the well known manner.

It has been found that in the process of the application mentioned above, other resinous binders may be used instead of hardenable phenol-aldehyde resins or with these in admixture, such as are obtained by the condensation of polyhydric alcohols and polybasic acids, for example, glycerin and phthalic acid anhydride, or by the condensation of ureas or urea derivatives and aldehydes. The invention is carried out by dissolving these condensation products in a solvent capable also of dissolving the resinous products in the B stage; then a polymerization is effected by heating to the B condition, and the solutions obtained are used for the manufacture of abrasives and if necessary after partially distilling off the solvents. Hardenable condensation products can be dissolved and converted into the B-condition; but it is also possible to start with non-hardenable resins and convert them while in solution into hardenable resins by the addition of hardening agents and then into B resins. One can also proceed by dissolving the resin-forming ingredients in the solvent for B resins, then effecting a condensation and finally a polymerization of the initial condensation products thus formed by further heating until the B condition is reached. The beginning of this condition is made apparent by the fact that, when heating the dissolved resin, water is no longer formed. Liquids can be included with the solvents for B resins that in themselves are not capable of dissolving B resins. Also other hardenable or non-hardenable natural or synthetic resins may be used as binders in conjunction with the B resins from polyhydric alcohols and polybasic acids, or from ureas and aldehydes. Further, with the abrasive mixtures containing B resins in solution there can be incorporated catalysts, plasticizing agents, hardening agents or the like. These substances can be added to the mixtures in any suitable stage of the process. A mixture of several B resins or solutions which simultaneously contain several dissolved B resins can moreover be used, as for example phenol-aldehyde resins mixed with urea-aldehyde resins, and if desired the further addition of condensation products from polyhydric alcohols and polybasic acids.

The manufacture of abrasive or polishing tools is accomplished in the usual manner by intimately mixing the abrasive materials with the B resin solution and producing the articles by hot-pressing or cold molding and subsequent heating. In manipulating the grinding materials and resin binders, one may, of course, use also any other suitable process. The solvents for dissolving the B resin may, if necessary, be completely or partly eliminated from the mixtures, as for example before hardening.

Substantially the same advantages are obtained with the binders herein described as when the phenol-aldehyde resins in B condition are used. Condensation products from polyhydric alcohols and polybasic acids, or from urea-aldehyde resins used in place of phenol-aldehyde condensation products, or in admixture with them, offer, however, the further advantage that the mechanical properties and resistance to high temperatures are improved, and that more possibilities are offered to vary and influence the condition of the products to be made to accord with a desired end.

Examples 1. 10 kilos of an initial condensation product from phthalic acid anhydride and glycerin are dissolved in 3.5 kilos phthalic acid diethyl ester, and the solution is heated until water is not separated any more. The solution is then kneaded with 90 kilos abrasive powder and .3 kilo zinc oxide and the mixture is cold molded. The molded articles are then subjected to an after-heating at temperatures of from 100–200° C.

2. 10 kilos phthalic acid glycerin ester, 2.5 kilos furfural, 1.5 kilos methyl hexalin and 90 kilos corundum are heated in the kneading machine to temperatures of 150–180° until the mixture just allows in the cold to be agglomerated. (Further procedure as under 1).

3. 50 kilos urea-formaldehyde resin are heated in 10 kilos dichlorohydrin until water stops separating. No separation of resin should be noticeable. This solution is mixed with 400 kilos carborundum, and the mixture then is molded hot.

We claim:

1. Process of preparing a moldable composition suitable for the manufacture of abrasive and polishing tools which comprises bringing a member from the group consisting of urea-aldehyde and polybasic acid-polyhydric alcohol synthetic resins of the hardenable type into the B-state while in solution and mixing the solution obtained with abrasive.

2. Process according to claim 1 in which a hardenable synthetic resin of the phenol-aldehyde type is included in the mixture.

ERNST ELBEL.
OTTO SUSSENGUTH.